United States Patent
Benson (10) Patent No.: US 8,496,391 B2
(45) Date of Patent: Jul. 30, 2013

(54) METHOD FOR FORMING WORDS

(76) Inventor: Sherrie L. Benson, Redding, CA (US)

( * ) Notice: Subject to any disclaimer, the term of this patent is extended or adjusted under 35 U.S.C. 154(b) by 751 days.

(21) Appl. No.: 11/650,240

(22) Filed: Jan. 4, 2007

(65) Prior Publication Data

US 2008/0091410 A1    Apr. 17, 2008

Related U.S. Application Data (60) Provisional application No. 60/755,783, filed on Jan. 4, 2006.

(51) Int. Cl.
| | |
|---|---|
| *G06F 17/20* | (2006.01) |
| *G06F 17/28* | (2006.01) |
| *G06F 17/27* | (2006.01) |
| *G06F 3/042* | (2006.01) |
| *G06F 3/02* | (2006.01) |
| *B41J 2/00* | (2006.01) |
| *B41J 5/00* | (2006.01) |

(52) U.S. Cl.
USPC ............ 400/91; 704/1; 704/3; 704/9; 400/95; 400/100; 400/109; 400/110; 400/111; 715/261; 715/262; 345/171; 345/175

(58) Field of Classification Search
USPC .............. 704/1, 3; 400/91, 95, 100, 109, 110, 400/111; 715/261, 262; 345/171, 172
See application file for complete search history.

(56) References Cited

U.S. PATENT DOCUMENTS

| | | | | |
|---|---|---|---|---|
| 2,505,046 | A | * | 4/1950 | Holmes, Jr. ................... 400/482 |
| 3,465,865 | A | * | 9/1969 | Parker .............................. 400/93 |
| 3,970,185 | A | * | 7/1976 | Shelton ......................... 400/482 |
| 4,010,837 | A | * | 3/1977 | Gremillet ........................ 400/99 |
| 4,310,254 | A | * | 1/1982 | D'Angiolillo et al. ........ 400/109 |
| 4,765,764 | A | * | 8/1988 | Lefler ........................... 400/482 |
| 4,804,279 | A | * | 2/1989 | Berkelmans et al. ........... 400/94 |
| RE33,337 | E | * | 9/1990 | Lefler et al. ..................... 178/21 |
| 5,203,635 | A | * | 4/1993 | Freedman ....................... 400/91 |
| 5,360,343 | A | * | 11/1994 | Tang ............................. 434/118 |
| 5,649,223 | A | * | 7/1997 | Freeman ....................... 715/257 |
| 5,861,821 | A | * | 1/1999 | Kato et al. ...................... 341/22 |
| 6,041,292 | A | * | 3/2000 | Jochim ............................. 704/3 |
| 6,067,033 | A | * | 5/2000 | An ................................... 341/22 |
| 6,809,725 | B1 | * | 10/2004 | Zhang ........................... 345/171 |
| 7,506,252 | B2 | * | 3/2009 | Blumberg ..................... 715/256 |
| 2002/0150416 | A1 | * | 10/2002 | VanDruff ...................... 400/103 |
| 2003/0122785 | A1 | * | 7/2003 | Jayachandra ................. 345/171 |
| 2006/0061490 | A1 | * | 3/2006 | Benson ........................... 341/22 |

* cited by examiner

*Primary Examiner* — Paras D Shah
(74) *Attorney, Agent, or Firm* — Theodore J. Bielen, Jr.

(57) ABSTRACT

A method of forming words utilizing a character actuator unit in which the character actuators are segregated into certain categories. First and second categories are employed and activated simultaneously to generate the beginning and ending of a word. First and second actuating categories may be combined with third and fourth categories of actuators to further form and modify words in any languages.

8 Claims, 1 Drawing Sheet

METHOD FOR FORMING WORDS

CROSS-REFERENCES TO RELATED APPLICATIONS

The present non-provisional application claims the benefit of provisional application 60/755,783 filed 4 Jan. 2006.

BACKGROUND OF THE INVENTION

The present invention relates to a novel and useful method of forming words in conjunction with a character actuator unit.

The transcription of words in a quick and accurate manner is a desired objective and is necessarily increasingly important as societies become more and more complex. The common typewriter or keyboard allows a person to write a word through a series of consecutive strokes, one representing each letter of the word. Although the typewriter is an accurate transcriber of words it is generally too slow in reproducing words that are generated in a rapid manner, such as those spoken by a human at a court proceeding, a hearing, through a medium, and the like.

In the past, stenographic keyboards have been used to reproduce words based on a phonetic system generally following the thinking format of consonant-vowel-consonant for the English language. It should be noted that a different thinking format is often used in other languages. Although the stenographic keyboard provides a rapid writing of words, the spelling of such words is often abbreviated and requires the person using the stenographic keyboard to create a dictionary containing each word which may be written. Also, a single transcribed word often entails multiple strokes of a stenographic keyboard.

In the past, various systems have been proposed for writing words employing keyboards and the like. For example, U.S. Pat. Nos. 3,558,820 and 4,765,764 show stenographic keyboards which are used in conjunction with word processing systems to produce a readable transcript of spoken words created during a specific time period.

U.S. Pat. No. 4,010,837 describes a syllabic keyboard which peculiarly transmits the characters assigned to the keys to a storage unit which allows printing or storage of the same, as the case may be.

U.S. Pat. No. 3,170,185 teaches a syllabic typewriter in which portions of the keyboard are assigned and designated as such. Each syllable generated by such keyboard requires a stroke of the keyboard and is limited to a consonant-vowel-consonant structure to produce a word. The resulting transcribed words, although phonetically correct, do not represent words that are correctly spelled in all cases.

A method of forming a word in conjunction with a character actuator unit that quickly and accurately transcribes words in a single stroke with correct spelling would be a notable advance in the field of word processing.

BRIEF SUMMARY OF THE INVENTION

In accordance with the present invention a novel and useful method of forming a word or words in conjunction with a character actuator unit is herein provided.

The method of the present invention utilizes a character actuator unit, such as a keyboard, which is similar to a stenographic keyboard, but includes a plurality of actuators or keys that are segregated into certain categories or groups. An exemplary keyboard useable with the method of the present invention is shown in U.S. Pat. No. 6,948,868. The first category or group of actuators may represent or show consonants. Likewise, a second category of actuators may include consonants or consonants and vowels, a third category of actuators. It should be noted that particular consonants and or vowels designated in such categories in the present application are deemed to be workable in this regard, but are certainly not restricted to such particular consonants and/or vowels with respect to the method being sought for patenting.

In the method of the present invention a word is formed using the basic thinking of words in two parts: beginnings and endings. Further, based on all endings, new categories arise: some ending in vowels and some ending in consonants. A spelling table may be generated containing beginnings and endings of all words in all languages based on the Roman alphabet. In addition, a spelling table can be generated to include, in a layered form, languages not based on the Roman alphabet.

The method of the present invention generally employs segregating the character actuators of a character actuator unit into at least first and second categories of the same. By actuating one or more characters of the first and/or second categories of character actuators, simultaneously, the beginning and the end of a word is formed. It should be apparent that where consonants are employed as the first and second categories of character actuators, such combinations of consonants represent consonants, vowels, and combinations of the same.

In addition, a third category of character actuators may be employed which would generally form the ending of a word alone or in combination with the second category of character actuators. In many cases, such third category of character actuators may represent vowels in the Roman alphabet. Again, actuators of the first, second, and/or third category of actuators are activated simultaneously to produce signals representing the beginnings and ends of words, i.e. in a single stroke.

Moreover, a fourth category of character actuators having at least one character actuator may be employed to modify the spelling formed by the character actuators of the first and second and/or third category of character actuators.

The result is a system of producing words quickly and accurately with the proper spelling.

It may be apparent that a novel and useful method or system of producing words has been described.

It is therefore an object of the present invention to provide a method of forming words in which the user employs a character actuator unit and uses approximately half of the key strokes found in conventional methods of writing using characters actuators.

Another object of the present invention is to provide a method for forming words in which words may be formed in many languages.

A further object of the present invention is to provide a method of forming words in which a spelling table is used in conjunction with a character actuator unit so that words are formed from that spelling table, thus, eliminating the need for creating large dictionaries as is required in methods of the prior art.

Another object of the present invention is to provide a method of forming words in which the users can write foreign proper nouns with ease and speed.

Another object of the present invention is to provide a method for forming words in which the user can switch back and forth between languages without changing a thought process and without reference to different dictionaries or files.

A further object of the present invention is to provide a method of forming words which aids the user in learning a new language.

Yet another object of the present invention is to provide a method for forming words in which a user is able to rapidly and accurately take notes of a spoken language in various venues.

Another object of the present invention is to provide a method of forming words in conjunction with a character actuator unit that is useful to persons having physical disabilities.

Another object of the present invention is to provide a method of forming words in conjunction with a character actuator unit which simplifies the writing of words containing vowel endings.

A further object of the present invention is to provide a method of forming words with a character actuator unit which is useful to persons who translate documents from one language to another.

A further object of the present invention is to provide a method of allowing other mediums to be employed with the method of this invention, whether by voice, sound, electronics, the brain itself, or a combination of mediums, to access the intended key locations, for the purpose of easing handicap issues, for convenience, for accommodating size restrictions, portability restrictions and the like, which may be encountered in a specialized keyboard or device.

Another object of the present invention is to provide a method of forming a word or words which are preferably written in a single stroke or by other means to produce a signal representing a word or words, and which method is not limited to such single stroke.

The invention possesses other objects and advantages especially as concerns particular characteristics and features thereof which will become apparent as the specification continues.

For a better understanding of the invention reference is made to the following detailed description of the preferred embodiments of the invention which should be taken in conjunction with the above described drawings.

DETAILED DESCRIPTION OF THE PREFERRED EMBODIMENTS OF THE INVENTION

Various aspects of the present invention will evolve from the following detailed description of the preferred embodiments thereof which should be referenced to the prior described drawings.

Figure 1:
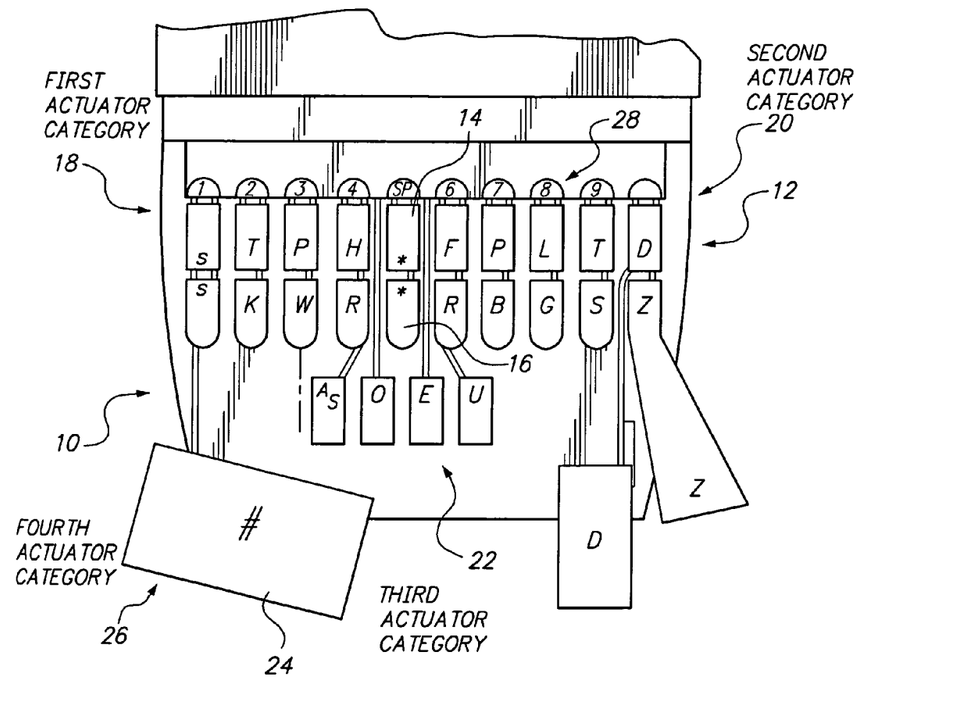
FIG. 1 is a top plan view of a character actuator unit in the form of a mechanical keyboard usable with the method of the present invention.

The method of the present invention is illustrated for use with a character actuator unit such as the unit 10 shown in FIG. 1. It should be noted that unit 10 is similar to the keyboard found in U.S. Pat. No. 6,948,868 which is incorporated by reference as a whole, hereto. Needless to say, character actuator unit 10 resembles a stenographic keyboard except that the various keys have been elongated, extended, or enlarged to accommodate pressing of certain of the plurality of actuators 12 with the palm regions of the hand.

Other keys of unit 10 are intended to be pressed by the operator's fingers. The present method utilizes the categorization or segregation f the plurality of character actuators 12 into specific groupings. With reference to FIG. 1, it may be observed that asterisk keys 14 and 16 represent a geometric reference for various categories of actuators and keys. For example, in viewing FIG. 1, the keys S, T, P, H, S, K, W, R to the left of asterisk keys 14 and 16 represent a first category of character actuators 18. Likewise, to the right of asterisk actuators 14 and 16, actuators F, P, L, T, D, R, B, G, S, and Z constitute second category of actuators 20. A third category 22 of actuators are represented by vowel keys A, O, E, and U. Finally, the number actuator 24 (#), and the asterisk keys 14, and other keys and 16 represent a fourth category of actuators 26. The interrelationship between the various categories of actuators will be described hereinafter with respect to the method of the present invention. The first category of actuators 18 represents the beginnings of words while the second and/or third category of actuators, 20, 22, represents the endings of words. Further, the asterisk keys for actuators 14 and 16, as well as number key 24, are able to modify the second and third categories of actuators 20 and 22, but do not affect the output of the first category of actuators 18. It should be realized that a keyboard may be employed where asterisk keys 14 and 16 may be split into four keys. The asterisk key can also be used to reverse the order in which the ending consonants are read. In addition, other "specialized keys" may be assigned to number keys 28 (1-9 and blank) of actuator unit 12. Other actuator modifiers 26 may also be used with the method of the present invention, which will be discussed hereinafter.

The basis of the method of the present invention relies on four types of consonant endings, utilizing actuators 20, for all words in languages based on the Roman alphabet. These consonants endings relate to actual keys on keyboard 10, and not to any language-based consonant endings. The first type of ending is the simple "consonant" ending having multiple or single consonants. The second type of consonant ending is the consonant-y ending which may include the combination of a single consonant y, or a multi-consonant-y ending. The third type of ending is the consonant-ry ending. Such ending consists of basically either a multiple consonant-ry ending or a single-consonant-ry ending. Finally, the fourth type of consonant ending may be categorized as the "no-consonant" ending. Actuators 20 are not used in this case, except when the D and Z keys are used.

It should be noted that mechanical keyboard or character actuator unit 10, FIG. 1, is only exemplar. Also, electronic, virtual, voice or other keyboard renditions may be employed, as long as a signal is generated in some manner by activation of any one of the character actuators shown in the categories of character actuators 18, 20, 22, and 26 heretofore described.

It also should be understood that words are formed or written by the method of the present invention in a single stroke using the palm portion and/or fingers of the hand of the user of the character actuator unit 10 according to the method of the present invention. In this regard, reference is again made to U.S. Pat. No. 6,948,868 which describes the combination of fingers and palm portions of the hand which may be employed in the manipulation of the actuator unit 10 depicted in FIG. 1. It should be mentioned that although words are written in a single stroke or otherwise with this method's most advanced usage, the method of the present invention does not preclude a user from generating more strokes/signals to produce a word.

With respect to the four types of consonant endings hereinabove described, these consonant endings, formed generally by using actuators 20, relate to actual keys on the keyboard 10, and not any language-based endings.

The method of this invention also provides for eight general types of vowels combinations formed using actuators 22, which when combined or purposely not combined with actuators 20 with or without any modifying actuators 26, form a word ending, or the second part of this two-part method.

It should be apparent that the method of this invention provides for: in first category of actuators 18, all beginning consonants used in any language based on the Roman alphabet; in second category of actuators 20, all ending consonants used in any language based on the Roman alphabet; in third category of actuators 22, all vowel keys necessary to compile the eight general types of vowels or vowel combinations; in fourth category of actuators 26, all modifier keys used in some cases to modify first and second/third actuators 18, 20, and 22 which comprise word beginnings and endings. It should be realized that each of the key actuators 28 (numbers 1, 2, 3, 4, SP, 6, 7, 8, 9 FIG. 1) could be designated as a modifier actuator 26. Also, the beginning "S" key and/or the ending "D" key could be split. One of each of such keys could be designated as a modifier actuator 26. In addition a new key or keys may be added to actuator unit 10 and be designated as modifier actuator 26.

The following table represents, in part, the assignment of character actuators or keys in the first category of actuators 18 to generate the beginnings of words:

TABLE I

FIRST CATEGORY OF ACTUATORS 18

| LETTERS GENERATED | KEY(S) USED IN CATEGORY 18 |
|---|---|
| B | PW |
| C | K |
| CH | KH |
| D | TK |
| F | TP |
| G | TKPW |
| H | H |
| J | SKWR |
| K | STK |
| L | HR |
| LL | TKHR |
| M | PH |
| N | TPH |
| P | P |
| Q | KW |
| R | R |
| S | S |
| T | T |
| V | SR |
| W | W |
| X | KP |
| Y | SKPH |
| Z | SKP |

The following Table II represents, in part, the assignment of character actuators or keys of second category 20 to assist in generating endings of words:

TABLE II

SECOND CATEGORY OF ACTUATORS 20

| LETTERS GENERATED | KEY(S) USED IN CATEGORY 20 |
|---|---|
| B | B |
| C | BG |
| CH | FBS |
| D | D |
| F | FP |
| G | G |
| H | FRB |
| J | FPGS |
| K | BS |
| L | L |
| M | PL |
| N | PB |
| Ñ | RPGTS |
| P | P |
| Q | PGS |
| R | R |
| S | S |
| T | T |
| TH | PT |
| V | F |
| W | FB |
| X | BLGS |
| Y | FPG |
| YY | FRPGTS |
| Z | *S OR *Z |
| β, βt | BLT |

The following Table III shows, in general, the eight vowels or vowel combinations which affect the formation of word endings: i.e. (1) short vowels, (2) long vowels, (3) "AO" vowels, (4) AEU/OEU vowels, (5) Latin vowels, (6) AU/OU vowels, (7) U vowels, and (8) no vowels: using actuators 22 of FIG. 1.

TABLE III

SHORT VOWELS
KEYS USED

A
E
EU
O
U

LONG VOWELS
KEYS USED

AE
AOE
AOEU
OE
AOU

AO VOWELS
KEY USED

AO

AEU/OEU VOWELS
KEYS USED

AEU
OEU
LATIN VOWELS (using in this example simple consonant ending "T" and showing sample word created)

| ACTUAL PRINTOUT | KEYS USED | SAMPLE WORD |
|---|---|---|
| ATA | A#ET | data |
| ATO | A#UT | gato |
| ATE | A#T | date |
| ETA | O#ET | beta |
| ETO | O#UT | veto |
| ETE | #ET | Pete |
| ITA | AO#T | vita |
| ITO | AO#EUT | Ito |
| ITE | #EUT | bite |
| OTA | A#EUT | nota |
| OTO | O#EUT | Moto |

TABLE III-continued

| | | |
|---|---|---|
| OTE | O#T | vote |
| UTA | AO#E | Uta |
| UTO | AO#U | Muto |
| UTE | #UT | mute |

AU/OU VOWELS
KEYS USED

AU
OU

U VOWELS
KEY USED

U

NO VOWELS
KEYS USED

None

It should be understood that the categories of character actuators 18, 20, and 22 are arbitrary. However, categories are chosen in order to allow a word to preferably be written in one stroke, an important criteria for choosing categories of character actuators.

The following represents the generation of four types of consonant endings:

| ACTUAL PRINTOUT | ACTUATOR KEYS 20 |
|---|---|
| T | T (single-consonant) |
| LST | LST (multi-consonant) |
| LY | RBLG (single-consonant-y) |
| NCY | FRPLS (multi-consonant-y) |
| TRY | FBT (single-consonant-ry) |
| NTRY | FPBT (multi-consonant-ry) |

There are obviously no entries for "no-consonant" endings, however, the "D" and "Z" keys of actuator unit 10 used for plurals and "D" or "ED" endings would still retain their same function.

It should further be apparent that the method of the present invention uses an extensive table of consonant endings and eight categories of vowels to arrive at word endings, which together with any modifiers deriving from actuators 26 form the second part of this two-part method.

It should now be apparent that the method of this invention uses a table of beginning consonants to arrive at word beginnings, which together with any modifiers (actuators 26) form the first part (word beginning) of this two-part method.

As heretofore noted modifiers generated by actuators 26, a fourth category of actuators, affect the word being formed by actuators 18, 20 and/or 22. In the embodiment of the present application asterisk keys 14 and 16, number key 24, and keys 28 achieve this result, FIG. 1.

The following words are formed and the below illustration includes modification using the asterisk key 14 or 16:

| KEYS | WORD |
|---|---|
| PWAO*T | BOAT |
| PWAOT | BOOT |
| TKPWO*UT | GOTU |
| TKPWOUT | GOUT |

The following words are formed and modified using the number key 24:

| KEYS | WORD |
|---|---|
| TKA#ET | DATA |
| TPHA#UT | NATO |
| PHA#T | MATE |
| AO#EUT | ITO |
| PWO#ET | BETA |
| SRAO#T | VITA |

The inclusion of the "D" key, which may be palm pressed on actuator unit 10, adds a "D" or an "ED" ending to words. For example the following words are formed:

| KEYS | WORD |
|---|---|
| PW#ATD | BATED |
| KOELD | COLD |
| TPHO#TD | NOTED |
| PH#UTD | MUTED |
| K#EUTD | CITED |
| PWAOTD | BOOTED |
| PWAEUTD | BAITED |

The addition of a "Z" to words forms plurals as shown below:

| KEYS | WORD |
|---|---|
| PWAETZ | BATS |
| KOETZ | COTS |
| PWAOUTZ | BUTS |
| SAOEUTZ | SITS |

It should be realized that the asterisk key changing a consonant ending takes precedence over the asterisk key changing a vowel structure with this method. The addition of a "G" together with the asterisk key within the stroke can add an "ING" to the word except with Latin vowel endings.

| KEYS | WORD |
|---|---|
| TKA*EGT | DATING |
| SRO*EGT | VOTING |
| PWA*GT | BATTING |
| PW*EGT | BETTING |

The addition of an "R" together with the asterisk key within a stroke can add a vowel-r ending.

| KEYS | WORD |
|---|---|
| PWA*RT | BATTER |
| PHAO*ERT | METER |
| TKPWA*RPT | GATHER |

In some cases the asterisk key will designate that the ending consonants should be read backwards, as in the word mason (PHA*EPBS).

In certain cases asterisk key 14 may be differentiated from asterisk key 16 to form certain words.

Further, the fourth category of actuators 26 would include the use of the number key indicated by #. The # is used to create Latin-vowel endings. For example using the third category of actuators 22 (AOEU) the following endings may be formed:

| KEYS | ENDINGS |
|---|---|
| A#ET | ATA |
| A#UT | ATO |
| A#T | ATE |
| AO#EUT | ITO |
| O#ET | ETA |
| AO#T | ITA |

Also, a word such as "DATA" would be spelled using the keys "TKA#ET". Thus, the # key is used to modify endings to create such "Latin" word combinations, and, as such, is a modifier.

Word-beginning modifiers are only used with the most advanced usage of this method to facilitate writing all words in one stroke. They are not necessary for the implementation of this method for any other of the uses claimed by this patent. In some cases, without the available use of the beginning modifiers, one may use the regular 14 and 16 asterisk key to modify the beginnings. For example, the word: prieto (KPRO#*UT).

Finally, keys may be chosen as whole-word modifying keys. These keys are generally selected by the user, and are restricted only by the modifying keys or triggers available with the keyboard or device 10. For instance, to capitalize a word the method provides for use of the actuators 14 or 16 stroked (as a separate stroke) after the word, two asterisks stroked after two words to be capitalized, and so on, with the user adding another asterisk for each additional capitalization of a prior word. For example, the word "court" (KOURT) is changed to Court (KOURT)+(*). Such capitalization stroke may be modified by the user to create two words which are capitalized with one uncapitalized word between them.

Also, the method provides for the number key by itself to be used as an accent key, so as to differentiate, if needed, between words like resume and resume. It should be noted that any of the modifier keys 26 could be substituted to achieve the capitalization or accenting of words.

The languages the user wishes to write may be predesignated by the user.

The table of beginnings, Table I, shows in part, a list of beginnings. Those beginnings are shown in Table I as single generated letter, with the exception of LL or CH. However, also available within a complete list of beginnings are actuator key designations of actuators 18 which result in multiple letters. These multiple-letter designations are separated into the two additional components, identified herein as "convos" and "concos", which add to the word beginnings, and which, when combined with the word endings, may change or enhance the whole of the word. These two additional components consist of designated beginnings from actuators 18, either with or without the beginning modifiers of actuators 26 previously mentioned.

The first of these two additional components are called "convos." The word "convo" represents special consonant-vowel combinations within the beginning keys or actuators 18. A typical list of these convos is given below:

| LETTERS GENERATED | KEYS OF ACTUATORS 18 USED |
|---|---|
| QU | KW |
| RU | TKH |
| HU | TPWHR |
| MU | PWH |
| NU | TPWH |
| PU | KPW |
| SU | SW |
| TU | TW |
| WE, SCHU | SKWH |
| SQU | SKW |
| STU | STW |
| VU | STPW |
| ZU | SKPW |
| ME | STPWHR |
| NE | STPWR |
| HE | STWH |
| PE | SKPR |
| GE | TKPR |
| SCI | STKWR |
| TI | TWR |
| STI | STWR |
| RI | SKPWR |
| BE | SPWHR |
| DE | TKWHR |
| FE | TKWH |
| BI | KPWR |
| DI | TKWR |
| FI | TPWR |
| GI | STKPWR |
| WU | SPWR |
| SI | SWR |
| LE | STKWHR |
| TE | TWHR |
| SE | SWHR |
| RE | STWHR |
| VE | STPR |
| VI | STPHR |
| LI | KWHR |
| HI | KWH |
| CI | KPHR |
| MI | KPWHR |
| I | KWR |
| BU, SPU | SPW |
| CE, KE | STKP |
| CU, KU | STKW |
| PI | KPR |
| LU | WHR |
| DU | TKW |
| FU | TPW |
| KI | STKPHR |
| GU | STKPW |
| JE | SKPHR |
| JU | STKPR |
| ZE | SKPWH |
| ZI | STKWH |
| RU | TKH |
| ME | STPWHR |
| NI | STKPWHR |

In addition to the above shown list of convos there are also available with this method the "convos" A, E, I, O, and U. Although they do not contain consonants, when they appear alone they are considered "convos" for purposes of this application and are shown below:

| VOWEL | KEY USED IN ACTUATORS 18 |
|---|---|
| A | STP |
| E | SPHR |
| I | KWR |

-continued

| VOWEL | KEY USED IN ACTUATORS 18 |
|---|---|
| O | STHR |
| U | SPH |

It should now be apparent that words could then be formed from the combining of word beginnings generated by actuators 18, with word endings generated by actuators 20 and 22, as listed below:
1. The convo "PI" beginning could be combined and written with the Latin vowels single consonant ending "ANO" to form the word "piano." (keys: KPRA#UPB)
2. The convo "DU" beginning could be combined and written with the Latin vowels single consonant ending "ANE" to form the word "Duane." (keys: TKW#APB)
3. The convo "BU" beginning could be combined and written with the Latin vowels single consonant ending "ENA" to form the word "Buena." (keys: SPWA#EPB)

The second of the two additional components are called "concos." The word "conco" represents special consonant-consonant combinations using the word beginning keys, or actuators 18, formed using only those keys. A partial list of these "concos" is given below:

| LETTERS GENERATED | KEYS USED IN ACTUATORS 18 |
|---|---|
| PL | PHR |
| FR | TPR |
| TH | TH |
| DW | TKWH |
| SR | SR |
| EX | KP |
| SK | STP |
| SPL | SPHR |
| PHR | STHR |
| BR | PWR |
| CR | KR |
| KR | STKR |
| CL, CHR | KHR |
| DR | TKR |
| CH | KH |
| SH | SH |
| SL, SHR | SHR |
| TR, | TR |
| FL, VL | TPHR |
| PH | STH |
| PR | PR |
| ST | ST |
| SP | SP |
| SC | SK |
| SPR | SPR |
| STR | STR |
| SCR | SKR |
| SM | SPH |
| SN | STPH |
| THR | THR |
| DH, DCH | TKH |
| WR | WR |
| KN, CN, DN | TKPH |
| RH | TKPHR |

Note also that the convos A, E, I, O and U can have consonants added after them using actuators 18, and those combinations then become concos for purposes of this method.

It should again be apparent that additional words could then be formed from the combining of a word beginning using actuators 18, with a word ending using actuators 20 and 22, as listed below:

1. The "conco" "FR" beginning could be combined and written with the Latin vowels single consonant ending "AME," to form the word "frame." (keys: TPRA#PL)
2. The "conco" "TH" could be combined and written with the Latin vowels single consonant ending "AMES" to form the word "Thames." (keys: THA#PLZ) In this example the ending "Z" key is included in the stroke to form the plural.
3. The "conco" "DW" beginning could be combined and written with the Latin vowels multi-consonant ending "AYNE" to form the word "Dwayne." (keys: TKWHA#FPBG)

The method of this invention also uses word beginning modifiers with these "convos" and "concos". In the present embodiment asterisk key 14 or 16 may be used as a "convos" modifier actuator if the designated or specified asterisk keys are not available ("beginning" asterisk keys).

When the asterisk key 14 or 16 is added to the "convos", another consonant or consonants is placed within the "convo". A partial list of these modified convos is given below:

| LETTERS GENERATED | KEYS USED IN ACTUATORS 18 AND* |
|---|---|
| PRI | KPR* |
| DRU | TKW* |
| BLU | SPW* |

In the present case any or all number keys 28 may be designated as such a function key. As heretofore stated, specified asterisk keys may also be used. Likewise, the modifier key for the "concos" may for purposes of delineation be called a function key or keys. The modifier key for the "concos" may be a function key. When a function key is added to the "concos" another "a" vowel or vowels are placed within the "concos". A partial list of these modified "concos" is given below. "With FK" indicates that the function key is also added to the stroke:

| PIL | PHR (with FK) |
| FOR | TPR (with FK) |
| TEH | TH (with FK) |
| DUW | TKWH (with FK) |

In certain cases an additional function key may be added to actuator unit 10, in substitution for number keys 28

It should again be apparent that additional words could then be formed from the combining word beginnings generated by actuators 18 with word endings generated by actuators 20 and/or 22, as follows:
1. The modified "convo" "PRI" beginning could be combined and written with the Latin vowels single consonant ending "ETO," to form the word prieto (keys: KPRO*#UT)
2. The modified "conco" "PIL" beginning could be combined and written with the Latin vowels single consonant ending "ATES," to form the word "Pilates." (keys: PHRA#TZ(With FK)) In this example the ending Z key is included in the stroke to form the plural.
3. The conco "TEH" beginning could be combined and written with the Latin vowels single consonant ending "AMA" to form the word "Tehama." (keys: THA#EPL (With FK))

4. The conco "DUW" beginning could be combined and written with the Latin vowels single-consonant ending "AYNE" to form the word "Duwayne." (keys: TKWHA#FPBG (With FK) The following is a list of the eight types of vowel structures used with the method of the present invention:
1-A: Short vowels
1-B: Short vowels with asterisk
1-C: Convos with short vowels
1-D: Convos with short vowels, with asterisk
1-E: Concos with short vowels
1-F: Concos with short vowel with asterisk
2-A: Short Long vowels
2-B: Short Long vowels with asterisk
2-C: Convos with long vowels
2-D: Convos with long vowels, with asterisk
2-E: Concos with long vowels
2-F: Concos with long vowel with asterisk
3-A: "AO" vowels
3-B: "AO" vowels with asterisk
3-C: Convos plus "AO" vowels
3-D: Convos plus "AO" vowels, with asterisk
3-E: Concos plus "AO" vowels
3-F: Concos plus "AO" vowels, with asterisk
4-A: AEU/OEU
4-B: AEU/OEU with asterisk
4-C: Convos plus AEU/OEU
4-D: Convos plus AEU/OEU, with asterisk
4-E: Concos plus AEU/OEU
4-F: Concos plus AEU/OEU, with asterisk
5-A: Latin vowels
5-B: Latin vowels with asterisk
5-C: Convos plus Latin vowels
5-D: Convos plus Latin vowels, with asterisk
5-E: Concos plus Latin vowels
5-F: Concos plus Latin vowels, with asterisk
6-A: AU/OU
6-B: AU/OU with asterisk
6-C: Convos plus AU/OU
6-D: Convos plus AU/OU, with asterisk
6-E: Concos plus AU/OU
6-F: Concos plus AU/OU, with asterisk
7-A: U
7-B: U with asterisk
7-C: Convos plus U
7-D: Convos plus U, with asterisk
7-E: Concos plus U
7-F: Concos plus U, with asterisk
8-A: No vowels
8-B: No vowels with asterisk
8-C: No vowels with number key
8-D: No vowels with number key and asterisk
8-E: Convos with no vowels
8-F: Convos with no vowels, with asterisk
8-G: Convos with no vowels, with number key
8-H: Convos with no vowels, with asterisk and number key
8-I: Concos with no vowels
8-J: Concos with no vowels, with asterisk
8-K: Concos with no vowels, with number key
8-L: Concos with no vowels, with asterisk and number key
The following is a list of the four types of consonant endings used with the method of the present invention:
Consonant Endings:
1. simple consonant (single and multi)
2. consonant-y (single and multi)
3. consonant-ry (single and multi)
4. no-consonant This method requires key outlines for all consonant endings needed to write in any language based on the Roman alphabet. The following is a list of some simple consonant endings generated by the method of the present invention.

| LETTERS GENERATED | KEYS USED IN ACTUATORS 20 |
| --- | --- |
| BT | BT |
| RBL | RBL |
| WS | FBZ |
| LST | LTS |
| LT | LT |
| RK | RBS |
| CK | BGS |
| GH | FG |
| RF | FRP |
| RYL | FRPLG |
| YR | FRPG |
| RP | RP |
| RG | RG |
| LC | BLG |
| TCH | FPS |
| RTCH | FRPS |
| GM | PLG |
| RN | RPB |
| RV | FR |
| RT | RT |
| RST | RTS |
| RCH | FRBS |
| SCH | FBGS |
| HN | FRPBS |
| GL | LG |
| NG | PBG |
| SH | FS |
| CH | FBS |
| PH | FRPB |
| NT | PBT |
| KT | BTS |
| VT | FT |
| MPL | PBLS |
| MBL | PBLGS |
| HL | FRBL |

The following constitutes a list of consonant-ry ending which may be used to form words.

| RY ENDINGS | KEYS USED |
| --- | --- |
| RDRY | FRPBLTS |
| FCRY | FBLGTS |
| STRY | FBTS |
| NTRY | FPBT |
| CTRY | FBGT |
| NRY | FRPBT |
| MRY, RMRY | FRPBLT |
| SRY | FPBLG |
| TRY | FBT |
| NSTRY | FPBTS |
| FRY | FRPGS |
| RRY | FPLGS (only for use with rules pertaining to consonant-r-y ending strokes) |
| MBRY | RPBTS |
| PRY | RPS |
| LPRY | RPLT |
| LFRY, LVRY | FRBLT |
| LBRY | RPBLGS |
| NDRY | FRLGTS |
| LTRY | FBLT |
| GRY, QRY | FRG |
| MPRY | RPTS |
| CRY, KRY, CHRY, CKRY | FLTS |
| NGRY | FRPBGS |
| LDRY, LSTRY | FBLTS |

-continued

| RY ENDINGS | KEYS USED |
|---|---|
| JRY, RJRY | FRBLTS |
| DRY | FRPLTS |
| WRY, RSKY | FRPBGTS |
| LRY, WLRY | RPLGS |
| VRY | FLS |
| BRY | FRLG |
| HRY | FRBLGT |
| MTRY, MPTRY | FPBLT |
| NCRY | FPLTS |

The following lists consonant-y endings created by the method of the present invention:

| Y-ENDINGS | KEYS USED |
|---|---|
| WY, LVY | FRBLG |
| RY | RBLGS |
| BY | RPGS |
| PY | RPG |
| NCY | FRPLS |
| NY | FRLGS |
| THY, RTHY | RPBGTS |
| LSY, CHLY, LCY | FRBLGS |
| RBY, RTHY | RPST |
| RDY | RPLT |
| NGY | FRGTS |
| NSY | RPBGS |
| NCY | FRPLS |
| MY | RPBLG |
| WLY | FBLG |
| LY | RBLG |
| LTY | RBLGT |
| RSLY, RBLY | RBLS |
| NLY | PLGTS |
| RLY | RLS |
| RTY | RLGT |
| RPHY | FRPS |
| NDY | RPBLT |
| SY | RBGS |
| DY | RBGD |
| TY | RBGT |
| SKY | FRBGTS |
| SPY, RDRY | FRPBLTS |
| STY | RBGTS |
| WKY, FCRY | FBLGTS |
| NTHY | PBLTS |
| CY | FRGS |
| ZY | FBLGT |
| RCY | FRGT |
| LKY | RPBLS |
| MKY | *RPBLS |
| RVY | FRS |
| SEY | FGTS |
| EY | FBGS |
| GRY, GHTY | FRBGT |
| FY | FRPBG |
| MPY, MBY, MFY | FRPBLG |
| LMY | *FRPBLG |
| CKY | RBLGTS |
| TCHY | FPTS |
| XY | FRPTS |
| SLY | RBLTS |
| MDY | RBLT |
| Y | FPG |
| LFY | *FRPBLGS |
| FTY, VNTY | FRPBGT |
| VY | FRBG |
| RCHY | FRBTS |
| HY | FRBT |
| NTLY, LTHY, MTY | RPBLGT |
| NDY | RPBLT |
| JY | FRBLS |
| NJY | FRPBLS |
| LPHY, MPHY | FRPBLS |

-continued

| Y-ENDINGS | KEYS USED |
|---|---|
| NSLY | FPBLGS |
| RNY | RPBS |
| KY | FRLT |
| RKY | FRLTS |
| LDY | FRBLGTS |
| JY | FRBLS |
| NCY | FRPLS |
| NSY or ZNY | RPBGS |
| NTY | RPBGT |
| NGY | FRGTS |
| NKY, LTHY | RPBLGTS |
| WNY | FPBGS |
| SHY | FBLGS |
| RJY | FRBLTS |
| CHY | FRPBLGT |
| MPTY | FRPBLGT |
| NCHY | FRPBLGTS |
| RSKY | FRPBGTS |
| LGY | RLGS |
| TMY | FPLGTS |
| RHY | FRBLGT |
| FCY, LJY | FPLGS |

Multi-consonant-LY endings, because they are so numerous, have an additional "shortcut" method of formation with this method using all consonant keys in the given word together with or without the asterisk.

Beginnings List

Note that any two consonants can be combined also for beginnings, as in the word "Bjorn." Even though the SKPWR default is "RI," in some instances it is "BJ." Some of these combinations are listed, but other combinations may be formed using the entries in the beginnings alphabet.

| LETTERS GENERATED | KEYS USED IN ACTUATORS 18 |
|---|---|
| B | PW |
| C | K |
| D | TK |
| F | TP |
| G | TKPW |
| H | H |
| J | SKWR |
| K | STK |
| L | HR |
| M | PH |
| N | TPH |
| P | P |
| QU or Q | KW |
| R | R |
| S | S |
| T | T |
| V, SR, SUR, SER | SR |
| W | W |
| EX, X | KP |
| Y | SKPH |
| Z | SKP |
| SK, A | STP |
| SPL, E | SPHR |
| PHR, O | STHR |
| BR | PWR |
| CR | KR |
| KR | STKR |
| CL, CHR, COL, CAL | KHR |
| DR | TKR |
| CH | KH |
| SH | SH |
| SL, SHR | SHR |
| TR, TOR, TER | TR |
| FL, VL, VAL, VEL | TPHR |
| PH | STH |

-continued

| LETTERS GENERATED | KEYS USED IN ACTUATORS 18 |
|---|---|
| PR | PR |
| ST | ST |
| SP | SP |
| SC | SK |
| SPR | SPR |
| STR, TVA | STR |
| SCR | SKR |
| SM | SPH |
| SN | STPH |
| THR, TOL, TAL | THR |
| RU, DH, DCH | TKH |
| WR | WR |
| KN, CAN, CON, DEM, DEN | TKPH |
| RH | TKPHR |
| WH | WH |
| HU | TPWHR |
| MU | PWH |
| NU | TPWH |
| PU | KPW |
| SU | SW |
| SW | SWH |
| TU | TW |
| SL, KL, SAL, SYL, SOL | STKHR |
| SCH | SKH |
| JI, SCHL | SKPWHR |
| WI, SCL, SCHR | SKHR |
| WE, SCHU | SKWH |
| SQU | SKW |
| STU | STW |
| VU | STPW |
| ZU | SKPW |
| ME | STPWHR |
| NE | STPWR |
| HE | STWH |
| PE, PRE | SKPR |
| GE | TKPR |
| JL, HJ | SKWHR |
| SCI | STKWR |
| TI, TRI | TWR |
| STI | STWR |
| RI, PJ, BJ | SKPWR |
| BE | SPWHR |
| DE | TKWHR |
| FE, DW, DIO | TKWH |
| BI | KPWR |
| DI | TKWR |
| FI, BRT, | TPWR |
| GI | STKPWR |
| GR, GER | TKPWR |
| WU, INTER, INTR | SPWR |
| SI, SHI | SWR |
| LE | STKWHR |
| TE | TWHR |
| TW | TWH |
| SE, SHE | SWHR |
| RE | STWHR |
| VE | STPR |
| VI | STPHR |
| LL, DL, DEL | TKHR |
| PL, PAL, POL | PHR |
| LI | KWHR |
| HI | KWH |
| CI, CHI | KPHR |
| MI | KPWHR |
| BL | PWHR |
| GH, GN | TKPWH |
| GL, GIL, GAL | TKPWHR |
| I | KWR |
| BU, SPU | SPW |
| CE, KE, CHE | STKP |
| CU, KU, CHU | STKW |
| PI, EXP, EXPR, PRI | KPR |
| LU | WHR |
| DU | TKW |
| FU | TPW |
| YT | STKPH |
| KI | STKPHR |

-continued

| LETTERS GENERATED | KEYS USED IN ACTUATORS 18 |
|---|---|
| GU | STKPW |
| JE | SKPHR |
| JU, SZ | STKPR |
| ZE | SKPWH |
| ZI | STKWH |
| RU, DH | TKH |
| ME | STPWHR |
| NI, SNY | STKPWHR |
| KH | STKH |
| STR, TVA | STR |
| FR | TPR |
| COM | KPH |
| CL, CHR | KHR |
| SCL | SKHR |

Moreover, the consonant endings are combined with the vowel structures to form word endings. To these vowel-ending-consonant structures, simple beginnings or the more complex beginnings of "convos" and "concos" can be added, to affect the actual word produced. The convos and concos also follow specific patterns and rules across all endings, and are very helpful in further reducing key strokes. The concos may also use function keys, and the convos and concos may use beginning asterisk keys, to further modify their form.

The following is a representation of words formed using each the four consonant endings combined with each of the eight vowel structures. In addition, sample words are shown, the combining process is shown, and in some cases actual keys used are shown as well. Each of the vowel structures offers its own multi-layered format for forming words in many languages. All of the structures flow from one layer to the next. Consequently, the user's mindset is capable of flowing freely from language to language.

The following symbols are used hereinafter:
* represents the asterisk key or keys
# represents the number key
(FK) represents a function key
(BK) represents the beginning asterisk key or keys when so designated
Z=ending Z key added for plurals
D=ending D key added for "ed" "id" "ad" "od" "d" etc.

The following illustrations indicate words formed followed by key strokes in parenthesis:

1-A: Short Vowels Single-Consonant Multi-Consonant

| | |
|---|---|
| a. | simple consonant Matt (PHAT) Walt (WALT) |
| | M with short AT ending W with short ALT ending |
| b. | consonant-y sorry (SORBLGS) silky (SEURPBLS) |
| | S with short ORY ending S with short ILKY ending |
| c. | consonant-ry LEFBT pantry (PAFPBT) |
| | L with short ETRY ending P with short ANTRY |
| d. | no-consonant ma (PHA) re (RE) |
| | M with short A ending R with short E ending |

1-B: Short Vowels with * Single-Consonant Multi-Consonant

| | |
|---|---|
| a. | simple consonant (ties to next stroke) letter (HR*ERT) |
| | short vowels + * L + short ERT ending + * |
| b. | consonant-y cassis(KA*RBGSZ) rancid (RAFRPLSD) |
| | c + short ASY ending + * + Z R + short ANCY ending + * + D |

-continued c. consonant-ry Capri(KA*RPS) Astrid (A*FBTSD)
   C + short APRY ending + * short ASTRY ending + * + D
d. no-consonant (ties to next stroke)
   short vowels + *

1-C: Convos with Short Vowels Single Multi a. simple consonant Kaamm(STKPEPL) Dionn(TKWROPB)
   quirk(KWEURBS)
   KE + short EM DI + short ON QU + short IRK
b. consonant-Y really(STWHRARBLG) Realty(STWHRARBLGT)
   RE + short ALY RE + short ALTY
c. consonant-ry
   souffre(SWUFRPGS)Geoffre(TKPRFRPGS)
   Deanddre(TKWHRAFRLGTS)
   SU + short UFRY GE + short OFRY DE + short ANDRY
d. no-consonant tio (TWRO) Leo (STKWHRO)
   TI + short O LE + short O

1-D: Convos with Short Vowels with * Single and Multi a. simple consonant Caan(STKP*EPL) Cuiller (STKW*EURL)
   CE + short EN + * CU + short IRL + *
b. consonant-y Laurri(STKWHR * ERBLGS)
   Bianchi(KPWRA*FRPBLGTS)
   LE + short ERY + * BI + short ANCHY + *
c. consonant-ry coutri(STKW*UFBT) pailtri (SKPR*FBLT)
   CU + short UTRY + * PE + short ELTRY + *
d. no-consonant (Can tie to the next stroke)
   Short vowels + *

1-E: Concos with Short Vowels Single and Multi a. simple consonant Gregg (TKPWREG) Grant (TKPWRAPBT)
   GR + short EG GR + short ANT
b. consonant-y Bratty (PWRARBGT) tricky (TREURBLGTS)
   BR + short ATY TR + short ICKY
c. consonant-ry Alettre(STPHREFBT) Alanddre(STPHRFRLGTS)
   AL + short ETRY AL + short ANDRY
d. no-consonant Gnu (TKPWHU)
   GN + short U

1-F: Concos with Short Vowels with * Single and Multi a. simple consonant Szigg (SKPEUG)(BK) Schultz (SKH*ULTZ)
   SZ + short IG + (BK) SCH + short ULTS + * + Z
b. consonant-y Ramelli (PHR*ERBLG) (FK) Bertoldi
   (TPWRO*FRBLGTS) (FK)
   RM + short ELY + * + (FK) BRT + short OLDY + * + (FK)
c. consonant-ry demettri(TKPH*EFBT) (FK)
   DM + short ETRY + * + (FK)
d. no-consonant Ties to the next stroke.
   Short vowels + *.

2-A: Long Vowels. Single and Multi a. simple consonant. bat (BAET) mal (MAEL) Renal (RAOEPBL)
   B + long AT M + long AL R + long ENL
b. consonant-y. Katy (STKAERBGT) vanity
   K + long ATY V + long ANTY
c. consonant-ry. Malory (PHAERPLGS) History.
   M + long ATRY H + long ISTRY.
d. no-consonant. baa (PWAE), dee (TKAOE), coo (KOE),
   cii (KAOEU) cuu (KAOU)

2-B: Long Vowels with Asterisk Single and Multi a. simple consonant.
   Mein(PHAO*EUPB) Peut (PAO*UT) Falcon (TPA*EPBLG)
   M + long IN + * P + long UT + * F + long ANLC + *.
b. consonant-y. coli Boneti.
   C + long OLY + * B + long ONTY + *
c. consonant-ry. batteri (Swedish) Demetri
   B + long ATRY + * D + long EMTRY + *
d. no-consonant Tae (A*E) Bea (AO*E) Toe (O*E) sei (AO*EU)
   feu (AO*U) Lea L + long E + *.

2-C: Convos with Long Vowels.

a. simple consonant Dion, Lyon. Laurel.
   DI + long ON LE + long ERL
b. consonant-y ready reality
   RE + long ADY RE + long ALTY
c. consonant-ry Cuillère Geometry
   CU + long ILRY ending GE + long OMTRY
d. no-consonant. weii.
   WE + long I

2-D: Convos with Long Vowels, with Asterisk.

a. simple consonant. Caanan duodenal (TKWO*EPBLTS)
   CE + long EN + * DU + long ONLD + *
b. consonant-y Reili Violeti
   RE + long ILY + * VI+ * long OLTY + *
c. consonant-ry Autri Biometri
   E + long ETRY + * BI + long OMTRY + *
d. no-consonant. Laau
   LE + long U + *

2-E: Concos with Long Vowels.

a. simple consonant Stat cabral
   ST + long AT CBR + long AL
b. consonant-y Italy unity
   IT + long ALY UN + long ITY
c. consonant-ry January blustery
   JN + long URRY + (FK) (French URRY) BL + long USTRY
d. no-consonant Cree Knee
   CR + long E KN + long E

2-F: Concos with Long Vowels, with Asterisk.

a. simple consonant. Appareil.
   APR + long AOEUL + * + (FK)
b. consonant-y Natali Gioveneti
   NT + long ALY + * (FK) GV + long ENTY + * + (FK)
c. consonant-ry. Swedish "Januari" Colaneri
   JN + long URRY + * + (FK) CL + long ANRY + * + (FK)
d. no-consonant. rhea Taipei
   RH + long E + * TP + I + * + (FK)

3-A: "AO" Vowels.

| | | |
|---|---|---|
| a. | simple consonant | boot tooth (TAOPT) |
| | B + AOT T + AOPT | |
| b. | consonant-y | booty toothy contr |
| | B + AOTY T + AOTHY C + AONTY | |
| c. | consonant-ry | souffrir bootery souffririez |
| | S + AOFRY B + AOTRY S + AOFRY + Z | |
| d. | no-consonant | Cao |
| | C + AO | |

3-B: "AO" Vowels with Asterisk.

| | | |
|---|---|---|
| a. | simple consonant. | Boat, Noah. |
| | B + AOT + * N + + AO FRB * | |
| | Boalt (PWAO*LT) coalesces (KAO*BLGSZ) loafer | |
| | B + AOLT + * C + AOBLGSZ + * L + AORF + * | |
| b. | consonant-y | Naomi |
| | N + AOMY + * | |
| c. | consonant-ry | Boucherie |
| | B + AOCHRY + *. | |
| d. | no-consonant | boa |
| | B and the AO + * | |

3-C: Convos Plus "AO" Vowels.

| | | |
|---|---|---|
| a. | simple consonant | Ciaol (KPHRAOL) Caan |
| | CI + AOL CE + AON (another way to form AA) | |
| b. | consonant-y | Caamy Piotr Caathy |
| | CE + AOMY PI + AOTY CE + AOTHY | |
| c. | consonant-ry | Cuvrir |
| | CU + AOVRY | |
| d. | no-consonant | ciao |
| | CI + AO | |

3-D: Convos Plus "AO" Vowels, with Asterisk

| | | |
|---|---|---|
| a. | simple consonant | Gioan Caanan |
| | GI + AON + * CE + AON + * | |
| b. | consonant-y | Caami Looti Caachi |
| | CE + AOMY + * LU + AOTY + * CE + AOCHY + * | |
| c. | consonant-ry | (see Boucherie at 3-B) "ry" to "ri" |
| | Is the default but can be rie. This is most often used | |
| | With "rie" endings in French. | |
| d. | no-consonant | Kioa |
| | KI + AO + * | |

3-E: Concos Plus "AO" Vowels

| | | |
|---|---|---|
| a. | simple consonant | choose tycoon schooled |
| | CH + AOS TC + AON + (FK) SCH + AOL + D | |
| b. | consonant-y | Karoony |
| | KR + AONY + (FK) | |
| c. | consonant-ry | conquerir |
| | CN + AOQRY + (FK) | |
| d. | no-consonant | Karoo kangaroo |
| | KR + AO + (FK) KNGR + AO + (FK) | |

3-F: Concos Plus "AO" Vowels, with Asterisk

| | | |
|---|---|---|
| a. | simple consonant | Samoan snoozing |
| | SM + AON + * SN + AOG + * + Z | |

-continued

| | | |
|---|---|---|
| b. | consonant-ry | Bijouterie confrerie |
| | BJ + AOTRY + * + (FK) CN + AOFRY + * + (FK) | |
| c. | no-consonant | Genoa Maunaloa Ulloa |
| | GN + AO + * + (FK) MNL + AO + * + (FK) ULL + AO + * | |

4-A: AEU/OEU

| | | |
|---|---|---|
| a. | simple consonant | SOIR (SOEUR) BOIR (PWOEUR) |
| | Parker (PAEURBS) paint (PAEUPBT) sonnet (SOEUPBT) | |
| | S + OEUR B + OEUR P + AEURK P + AEUNT S + OEUNT | |
| b. | consonant-y | Cassier dossier Dainty fancier |
| | C + AEUSY D + OEUSY D + AEUNTY F + AEUNCY | |
| c. | consonant-ry | Ouvrier mordre |
| | OEUVRY M + OEUDRY | |
| d. | no-consonant. | moi (PHOEU) tai (TAEU) |
| | M + OEU T + AEU | |

4-B: AEU/OEU, with Asterisk

| | | |
|---|---|---|
| a. | simple consonant | soeur brouillard |
| | S + OEUR + * BR + OEURLD + * | |
| b. | consonant-y | Cassie Nancie |
| | C + AEUSY + * N + AEUNCY + * | |
| c. | consonant-ry | Voudriez |
| | V + OEUDRY + * + Z | |
| d. | no-consonant | maui (PHA*EU) oui (O*EU) |
| | M + AEU + * OEU + * | |

4-C: Convos Plus AEU/OEU.

| | | |
|---|---|---|
| a. | simple consonant | Paige toile Bonnete |
| | PE + AEUG TE + OEUL BE + OEUNT | |
| b. | consonant-y | heavier |
| | HE + AEU VY | |
| c. | consonant-ry | courrier |
| | CU + OEURRY ending | |
| d. | no-consonant | The U convos would print out |
| | as UOI and UAI. The E convos would print out as EOI and | |
| | EAI. The I convos would print out as IOI and IAI and may be | |
| | used with the U convo for a triple U, triple E with the | |
| | E convo, and triple I with the I convo | |

4-D: Convos Plus AEU/OEU, with Asterisk

| | | |
|---|---|---|
| a. | simple consonant | Soeil oeillet |
| | SE + OEUL + * E + OEULT + * | |
| b. | consonant-y | Deannie Sollvie |
| | DE + AEUNY + * SE + OEULVY + * | |
| c. | consonant-ry | Used for "rie" endings in words with |
| | a first vowel of A or O, where there is no vowel before the | |
| | rie. If there is a vowel before the "rie," the "AO" | |
| | platform is used. | |
| d. | no-consonant. | Zoei Oei oui |
| | ZE + OEU + * E + OEU + * U + OEU + * | |
| | With the S key added these entries become auie and ouie etc. | |
| | e.g. Louie. | |
| | LU + OEUS + * | |

4-E: Concos Plus AEU/OEU.

| | | |
|---|---|---|
| a. | simple consonant | Clair Travaille |
| | CL + AIR TRV + AIL + (FK) | |

|   |   |
|---|---|
| b. | consonant-y Knottier glossier |
|    | KN + OEUTY GL + OEUSY |
| c. | consonant-ry connaître couturier |
|    | CN + AEUTRY + (FK) CT + OEUTRY + (FK) |
| d. | no-consonant Lanai Hanoi |
|    | LN + AEU + (FK) HN + OEU + (FK) |

4-F: Concos Plus AEU/OEU, with Asterisk

|   |   |
|---|---|
| a. | simple consonant Hawaii engraisser fraichir |
|    | HW + AEUY + * + (FK) ENGR + AEURS + * FR + AEURCH + * |
| b. | consonant-y Flossie Kuwaiti |
|    | FL + OEUSY + * KW + AEUTY + * + (FK) |
| c. | consonant-ry Used for "rie" endings in words with A first vowel of A or O, where there is no vowel before the rie. If there is a vowel before the "rie" use the "AO" platform. |
| d. | no-consonant Rhaeu |
|    | RH + AEU + *. |

5-A: Latin Vowels (LV)=Latin Vowel

|   |   |
|---|---|
| a. | simple consonant |
|    | Hamas, (HA#EPLZ) Tempo (TO#UFPL) Virgo (SRAO#EURG) Santa (SA#EPBT) pampas (PA#EFPLZ) Malta (PHA#ELT) Santos (SA#UPBTZ) Pengad (PO#EPBGD) |
|    | H + (LV)AMA + Z T + (LV)EMPO V + (LV)IRGO |
|    | S + (LV)ANTA P + (LV)AMPA + Z M + (LV)ALTA |
|    | S + (LV)ANTO + Z P + (LV)ENGA + D. |
| b. | Consonant-y. Belle (PWE#RBLG) Motto (PHO#EURBGT) Latte (HRA#RBGT) villas (SRA#ORBLGZ) B + (LV)ELYE M + (LV)OTYO L + (LV)ATYE V + (LV)ILYA + Z |
| c. | consonant-ry Lladró (TKHRA#UFRPLTS) Metro (PHO#UFBT) Zebras (SKPO#EFRLGZ) Sandra (SA#EFRLGTS) Sacred, (SA#FLTSD) LL + (LV)ADRYO M + (LV)ETRYO Z + (LV)EBRYA + Z S + (LV)ANDRYA S + (LV)ACRYE + D |
| d. | no-consonant. As vowels appear |
|    | Samples: MAE (PHA#), MOE (PHO#), Lea (HRO#E) Baa (PWA#E) boa (PWA#EU) due (TK#U) Taos (TA#UZ) |
|    | M + (LV)AE M + (LV) OE L + (LV)EA B + (LV)AA |
|    | B + (LV) OA D + (LV)UE T + (LV)AO + Z |

5-B: Latin Vowels with Asterisk.

|   |   |
|---|---|
| a. | simple consonant ties to next stroke |
|    | Atlas (A#*ELTZ) Balma (PWA#*EFPL) |
|    | A + (LV)ALTA + * + Z B + (LV)ALMA + * |
| b. | consonant-y Maria (PHA#*ERBLGS) Marie (PHA#*RBLGS) Marnie (PHA#*RPBS) Narnia (TPHA#*ERPBS) |
|    | M + (LV) ARYA + * M + (LV) ARYE + * |
|    | M + (LV) ARNYE + * N + (LV) ARNYA + * |
| c. | consonant-ry Matria (PHA#*EFBT) librio (HRAO#*EUFRLG) |
|    | M + (LV)ATRYA + * L + (LV)IBRYO + * |
| d. | no-consonant Tiia Saia Meia |
|    | T + (LV)IA + * S + (LV)AA + * M + (LV)EA + * |

5-C: Convos with Latin Vowels

|   |   |
|---|---|
| a. | simple consonant Fuentes Duarte seance rieche deunces |
|    | FU + (LV)ENTE + Z DU + (LV)ARTE SE + (LV)ANCE |
|    | RI + (LV)ECHE DE + (LV)UNCE + Z |
| b. | consonant-y Luella Realidad |
|    | LU + (LV)ELYA RE + (LV)ALDYA + D |
| c. | consonant-ry Douvre Suivre Biafra nuestra siempre |
|    | DU + (LV)UVRYE SU + (LV)IVRYE BI + (LV)AFRYA |
|    | NU + (LV) ESTRYA SI + (LV)EMPRYE |
| d. | no-consonant Duaa |
|    | DU + (LV)AA |

5-D: Convos with Latin Vowels, with Asterisk

|   |   |
|---|---|
| a. | simple consonant Briana choice Shiite Aetna |
|    | BI + (LV)ANA + (BK) CU + (LV)UCE + (BK) SI (LV)ITE + (BK) A + (LV)ENTA + * |
| b. | consonant-y Laurie Deanie auntie |
|    | LE + (LV)ERYE + * DE + (LV)ANYE + * E + (LV)ENTYE + * |
| c. | consonant-ry Autrie would be written with the convo |
|    | E + (LV)ETRYE + * |
| d. | no-consonant Meaia |
|    | ME + (LV)AA + * |

(BK) = beginning asterisk

5-E: Concos with Latin Vowels

|   |   |
|---|---|
| a. | simple consonant strife asisto |
|    | STR + (LV)IFE AS + (LV)ISTO |
| b. | consonant-y Yvette kvitto(Swedish) Garaventa |
|    | YV + (LV)ETYE KV + (LV)ITYO GR + (LV)AVNTYA + (FK) |
| c. | consonant-ry Palabra Shandra Disastre |
|    | PL + (LV)ABRYA + (FK) SH + (LV)ANDRYA DS + (LV)ASTRYE + (FK) |
| d. | no-consonant Teepee |
|    | TP + (LV)EE + (FK) |

5-F: Concos with Latin Vowels, with Asterisk

|   |   |
|---|---|
| a. | simple consonant Bertagna Angelica |
|    | BRT + (LV)ANGA + * + (FK) ANG + (LV)ELCA + * |
| b. | consonant-y familia Amelia Somalia |
|    | FM + (LV)ILYA + * + (FK) AM + (LV)ELYA + * |
|    | SM + (LV)ALYA + * + (FK) |
| c. | consonant-ry Calebria Alandria |
|    | CL + (LV)EBRYA + * + (FK) AL + (LV)ANDRYA + * |
| d. | no-consonant Duweia |
|    | DW + (LV)EA + * + (FK) |

6-A: AU/OU

|   |   |
|---|---|
| a. | simple consonant sour taut bouey (PWOUFBGS) Faucet Coughey (KOUFGS) |
|    | S + OUR T + AUT B + OUEY F + AUCT C + OUGHEY |
| b. | consonant-y Saviour Monsieur avouer |
|    | S + AUVY M + OUNSY AUVY |
| c. | consonant-ry Horreur (HOUFPLGS) Laundry |
|    | H + OURRY (consonant-ry ending) L + AUNDRY |
| d. | no-consonant Tau Mau |
|    | T + AU M + AU |

6-B: AU/OU, with Asterisk

|   |   |
|---|---|
| a. | simple consonant gotu tofu(TO*UFP) Kauai(KA*UFBGS) |
|    | G + OUT + * T + OUF + * K + AUEY + * |
| b. | consonant-y carreaux Adieu oiseau nouveau Pontius |
|    | C + AURY + * + Z AUDY + * OUSY + * N + OUVY + * |
|    | P + OUNTY + * + Z |
| c. | consonant-ry Atrius Boudreau Landrieu dangereaux |

|   |   |
|---|---|
|   | AUTRY + * + Z B + OUDRY + * L + AUNDRY + *<br>D + AUNGRY + * + Z |
| d. | no-consonant Soius<br>S + OU + * + Z |

6-C: Convos Plus AU/OU

| | |
|---|---|
| a. | simple consonant seoul beaut Beaumont<br>SE + OUL BE + AUT BE + AUMT |
| b. | consonant-y beauty beautify<br>BE + AUTY ending BE + AUFTY |
| c. | consonant-ry Used for words ending in RIEUR, RIAUR RIUR, REOUR, REAUR, REUR, RAUR, ROUR, and sometimes ROUER |
| d. | no-consonant Luau Peau<br>LU + AU PE + AU |

6-D: Convos Plus AU/OU, with Asterisk

| | |
|---|---|
| a. | simple consonant soeur saeur Paulus<br>SE + OUR + * SE + AUR + * PU + AUL + * + Z |
| b. | consonant-y beautifying<br>BE + AUFTY + * + G |
| c. | consonant-ry Used for words with a beginning vowel of A or O, and ending in RIEU, RIAU, RIU, REAU, REOU, REU, RAU, or ROU. |
| d. | no-consonant Liaiu<br>LI + AU + * |

6-E: Concos Plus AU/OU

| | |
|---|---|
| a. | simple consonant trout Klaus surtout journaux cartouche draught toujours<br>TR + OUT KL + AU + Z SRT + OUT + (FK) JRN + AUX + (FK) CRT + OUCH + (FK) DR + AUGHT TJ + OUR + Z |
| b. | consonant-y cloudier Grouchier<br>CL + OUDY ending GR + OUCHY |
| c. | consonant-ry Bagarreur<br>BG + AURRY + (FK) (consonant-RY) |
| d. | no-consonant Rhau Niihau<br>RH + AU NH + AU + (FK) |

6-F: Concos Plus AU/OU, with Asterisk

| | |
|---|---|
| a. | simple consonant trouver Shamu<br>TR + OUFR + * SH + AUM + * |
| b. | consonant-y Calouti Chameau<br>CL + OUTY + * + (FK) CH + AUMY + *<br>Also used for words with EU, AU, OU, EAU, IU, IAU, and IEU endings, and with an A or an O as their beginning vowel. |
| c. | consonant-ry Montsoreau Chateauroux<br>MNT + OUSRY + * CH + AUTRY + *<br>Used for words with a beginning vowel of A or O, and ending in RIEU, RIAU, RIU, REAU, REOU, REU, RAU, or ROU. |
| d. | no-consonant Tsaiu<br>ST + AU + * |

7-A: U

| | |
|---|---|
| a. | simple consonant Same as the short vowel simple consonant Bull bunt |
| b. | consonant-y Same as short-vowelconsonant-Y Sully musty |
| c. | consonant-ry Same as short vowel-consonant-ry |
| d. | no-consonant tu<br>T + U |

7-B: U with Asterisk

| | |
|---|---|
| a. | simple consonant Same as short U plus the asterisk for the simple consonant endings. |
| b. | consonant-y Lucci Munci<br>L + short UCY + * M + short UNCY + *.<br>Same as the short-vowel-Y endings for the "U" vowel. |
| c. | consonant-ry Same as short U vowel with asterisk. |
| d. | no-consonant T+U+ * "tu" tied to the next stroke |

7-C: Convos Plus U

| | |
|---|---|
| a. | simple consonant Deus<br>DE + U + Z |
| b. | consonant-y Messieurs Serveur Pecheur<br>ME + USSY + Z SE + URVY PE + UCHY<br>Used for words with EUR, EAUR, IUR, IAUR, AUR IOUR, OUR, and IEUR endings, and with an E, U, or I as their beginning vowel. |
| c. | consonant-ry Used for words with an E, I, or U beginning vowel, and ending in RIEUR, RIAUR, RIUR, REOUR, REAUR, REUR, RAUR, ROUR. |
| d. | no-consonant Luu<br>LU + U |

7-D: Convos Plus U, with Asterisk

| | |
|---|---|
| a. | simple consonant menu (STPWHR*UPB) venue spectu jouais<br>ME + UN + * VE + UN + * + # SE + UCT + * + (BK) JU + UEY + * + Z |
| b. | consonant-y Belleau furieux serveau<br>BE + ULY + * FU + URY + * + Z SE + URVY + *<br>Used for words with EU, AU, OU, EAU, IU, IAU, and IEU endings, and with an E, or U, or I as their beginning vowel. |
| c. | consonant-ry vitreous<br>VI + UTRY + * + Z Used for words with an E, I, or U beginning vowel, and ending in RIEU, RIAU, RIU, REAU, REOU, REU, RAU, or ROU. |
| d. | no-consonant Luiu<br>LU + U + * |

7-E: Concos Plus U.

| | |
|---|---|
| a. | Simple consonant Shurr Shults<br>SH + UR SH + ULT + Z |
| b. | consonant-y Same as concos with short-vowel-Y endings. Sculpteur Crusty Depanneur Serviteur<br>SCLP + UTY + (FK) CR + USTY DP + UNY + (FK) SRV + UTY + (FK) Used for words with EUR, EAUR, IUR, IAUR, AUR, OUR, and IEUR endings, and with an E, U, or I as their beginning vowel. |
| c. | consonant-ry Used for words with an E, I, or U beginning vowel, and ending in RIEUR, RIAUR, RIUR, REOUR, REAUR, REUR, RAUR, ROUR. |
| d. | no-consonant Rhu<br>RH + U |

7-F: Concos Plus U, with Asterisk

| | |
|---|---|
| a. | simple consonant exitu fondue<br>EX + UT + (BK) + * FN + UD + * + # |
| b. | consonant-y Richlieu Serveau Cousineau Religieux<br>RCH + ULY + * SR + UVY + * CS + UNY + *<br>RL + UGY + * + Z<br>Words with EU, AU, OU, EAU, IU, IAU, and IEU endings, and with an E, or U, or I as their beginning vowel. |
| c. | consonant-ry Used for words with an E, I, or U beginning vowel, and ending in RIEU, RIAU, RIU, REAU, REOU, REU, RAU, or ROU. |
| d. | no-consonant Schriu<br>SCHR + U + * |

8-A: No Vowels

| | |
|---|---|
| a. | simple consonant family<br>F + ML |
| b. | consonant-y Corsair<br>C + RSEY |
| c. | consonant-ry Battery Lottery Hillary<br>B + TRY L + TRY H + LRY |
| d. | no-consonant User-patterned briefs |

8-B: No Vowels with Asterisk

| | |
|---|---|
| a. | simple consonant sadly in the raccon patent<br>Singing mingling Pasteur horreur<br>S + LD + * N + T + * R + NC + * P + NT + *<br>S + NG + * M + NLG + * P + RTS + * H + FRTS + * |
| b. | consonant-y Hanoi Masai Taipei<br>H + NEY + * M + SEY + * T + PEY + * |
| c. | consonant-ry souffririez<br>S + FRY + * + Z |
| d. | no-consonant User-patterned briefs |

8-C: No Vowels with Number Key

| | |
|---|---|
| a. | simple consonant president presidente Babette<br>P + T P + T + # B + T + # + (FK) |
| b. | consonant-y cassiere corollaire cassee derriere gouttiere<br>C + SY + # C + RLEY + # C + SEY + # D + RY + #<br>G + TY + # |
| c. | consonant-ry fourrure Ouvriere contraire<br>F + RRY + # (consonant-ry) VRY + # C + NTRY + #<br>Also used for RURE, RIRE, and sometimes ROURE ending words which have an O or A as their first vowel. |
| d. | no-consonant User-patterned briefs |

8-D: No Vowels with Number Key and Asterisk

| | |
|---|---|
| a. | Simple-consonant in thee mature pasture<br>N + T + * + # M + RT + * + # P + RTS + * + # |
| b. | consonant-y callieue casseaue banlieue<br>C + LY + * + # C + SY + * + # B + NLY + * + # |
| c. | consonant-ry For words ending in RIEUE, RIAUE, RIUE, REAUE, REOUE, REUE, RAUE, or ROUE. |
| d. | no-consonant |

8-E: Convos with No Vowels

| | |
|---|---|
| a. | simple consonant burner burger purely Bennet<br>BU + RN BU + RG PU + RL BE + NT |
| b. | consonant-y fussier sentier silkier<br>FU + SY SE + NTY SI + LKY |
| c. | consonant-ry fevrier etrier<br>FE + VRY E + TRY |
| d. | no-consonant User-patterned briefs |

8-F: Convos with No Vowels, with Asterisk

| | |
|---|---|
| a. | simple consonant bunion busily(SPW*LS) Emily Severely(SWHR*FRL) virtually Jillian Sergei<br>BU + N + * BU + LS + * E + ML<br>SE + FRL + * VI + RLT + * JI + NL + * SE + RGS + * |
| b. | consonant-y Terrie Sillvie<br>TE + RY + * SI + LVY + * |
| c. | consonant-ry aviarie<br>A + VRY + * Default ending is ierie |
| d. | no-consonant User-patterned briefs |

8-G: Convos with No Vowels, with Number Key

| | |
|---|---|
| a. | simple consonant Bennete Curlee<br>BE + NT + # |
| b. | consonant-y Curlee fussiere ecoeure derniere Fiancée<br>CU + RLEY + # FU + SY + # E + CY + # DE + RNY + #<br>FI + NCEY + # |
| c. | consonant-ry ouvriere decrire rentree<br>O + VRY + # DE + CRY + # RE + NTRY + # |
| d. | no-consonant User-patterned briefs |

8-H: Convos with No Vowels, with Asterisk and Number Key

| | |
|---|---|
| a. | simple consonant affreue munione Bettane Emmene ecoeure<br>A + FRY + * + # Mu + N + * + # BE + NT + * + #<br>E + NM + * + # E + RC + * + # |
| b. | consonant-y queued<br>QU + YY + * # + D |
| c. | consonant-ry Ouvreuses Vitreoue<br>O + VRY + * + # + Z VI + TRY + * + # |
| d. | no-consonant User-patterned briefs |

8-I: Concos with No Vowels

| | |
|---|---|
| a. | simple consonant Bennett Talbott<br>BN + NT + (FK) TL + BT + (FK) |
| b. | consonant-y fancier<br>FN + CY + (FK) |
| c. | consonant-ry Artillary<br>ART + LRY |
| d. | no-consonant User-patterned briefs |

8-J: Concos with No Vowels, with Asterisk

| | |
|---|---|
| a. | simple consonant bunion Gabriel tambien familial Blatant Sauveteur Bagarreur<br>BN + N + * + (FK) GB + RL + * + (FK) TM + BN + * + (FK) |

-continued

| | |
|---|---|
| | FM + L + * + (FK) BL + NT + * + SV + RT + * + (FK) |
| | BG + FRTS + * + (FK) |
| b. | consonant-y Sherrie |
| | SH + RY + * |
| c. | consonant-ry brasserie |
| | BR + SRY + * |
| d. | no-consonant User-patterned briefs |

8-K: Concos with No Vowels, with Number Key

| | |
|---|---|
| a. | simple consonant Bennette Babbette |
| | BN + NT + # + (FK) B + BT + # + (FK) |
| | Adds an "e" to the words formed using 8-I |
| b. | consonant-y questionnaire employee |
| | QST + NEY + # + (FK) EMPL + YEY + # |
| c. | consonant-ry itineraire |
| | IT + NRY + # |
| d. | no-consonant User-patterned briefs |

8-L: Concos with No Vowels, with Asterisk and Number Key

| | |
|---|---|
| a. | simple consonant Gabriele |
| | GB + RL + * + # + (FK) |
| | Adds an "e" to the words formed in 8-J |
| b. | consonant-y Desirree religieuse |
| | DS + RY + * + # RL + GY * + # + Z |
| c. | consonant-ry iee or ee endings |
| d. | no-consonant User-patterned briefs |

In addition to the aforementioned combinings of consonant endings with vowel structures, the vowel structures and consonant endings may also each stand alone, with no combining of actuators 18, 20, or 22 for purposes of this method; and those stand-alone keyed entries may be user-designated for each user's special purpose.

It should be realized that the aforementioned discussion only represent certain combinations of keys of actuators 12 which may be employed in the system of the present invention.

In operation, the user presses or activates any of the actuators or keys 12 of actuator unit 10 to create a signal representing initial beginnings and/or endings, with or without modifiers, according to Tables I-III and the preceding examples and illustrations. Such categories of actuators or keys are represented by categories 18, 20, 22, and 14, 16 and 26 shown on unit 10 of FIG. 1. In a single stroke, a word using the Roman alphabet is formed with correct spelling.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A method of forming a polysyllabic word using a character actuator unit having a first category of character actuators and second category of character actuators, and a third category of character actuators, comprising the steps of:
   a. assigning at least a first plurality of characters of the first category of actuators to represent a beginning of the polysyllabic word;
   b. assigning at least a second plurality of characters of the second category of actuators and assigning at least a third category of character actuators to represent the ending of the polysyllabic word, said beginning and ending of said polysyllabic word being independent of the syllabic content of said polysyllabic word;
   c. actuating a plurality of character actuators of said first category of character actuators, representing said first plurality of characters, to produce a first signal designating said beginning of the polysyllabic word;
   d. simultaneously, actuating certain of said second and third character actuators to produce a second signal designating the ending of the polysyllabic word without any activation of a division symbol between said beginning and ending of said polysyllabic word; and
   e. combining said first and second signals to create a representation of the polysyllabic word which is capable of being sensed.

2. The method of claim 1 which further comprises the additional step of segregating the character actuators of the character actuator unit into a fourth category of character actuators having at least one character actuator, and further comprises the step of actuating said one character actuator of said fourth category of character actuators to produce a third signal modifying the spelling of the polysyllabic word formed by said first and second signals.

3. The method of claim 1 in which said polysyllabic word formed by said first and second signals possesses proper spelling.

4. The method of claim 1 in which said second plurality of characters of said second category of character actuators represents a consonant word ending in a language.

5. The method of claim 1 in which said first plurality of characters of said first category of actuators represents a consonant word beginning in a language.

6. The method of claim 1 in which said certain character actuators of said third category of character actuators represents a vowel in a language.

7. The method of claim 6 in which said second plurality of characters of said second category of character actuators represents a consonant word ending in a language.

8. The method of claim 7 in which said first plurality of characters of said first category of actuators represents a consonant word beginning in a language.

* * * * *